(12) United States Patent
Zhao et al.

(10) Patent No.: US 12,481,103 B2
(45) Date of Patent: Nov. 25, 2025

(54) ADAPTER ASSEMBLY

(71) Applicant: ACCELINK TECHNOLOGIES CO., LTD., Wuhan (CN)

(72) Inventors: Xiaobo Zhao, Wuhan (CN); Zhechi Lu, Wuhan (CN); Xinhai Zhu, Wuhan (CN); Ping Gu, Wuhan (CN); Benqing Quan, Wuhan (CN); Chuanbin Zhang, Wuhan (CN); Yong Luo, Wuhan (CN)

(73) Assignee: ACCELINK TECHNOLOGIES CO., LTD., Wuhan (CN)

( * ) Notice: Subject to any disclaimer, the term of this patent is extended or adjusted under 35 U.S.C. 154(b) by 287 days.

(21) Appl. No.: 18/001,060

(22) PCT Filed: Dec. 22, 2020

(86) PCT No.: PCT/CN2020/138409
§ 371 (c)(1),
(2) Date: Dec. 7, 2022

(87) PCT Pub. No.: WO2021/258686
PCT Pub. Date: Dec. 30, 2021

(65) Prior Publication Data
US 2023/0204865 A1      Jun. 29, 2023

(30) Foreign Application Priority Data

Jun. 24, 2020   (CN) .......................... 202010592607.9

(51) Int. Cl.
*G02B 6/38* (2006.01)
(52) U.S. Cl.
CPC ......... *G02B 6/3825* (2013.01); *G02B 6/3878* (2013.01); *G02B 6/3831* (2013.01)
(58) Field of Classification Search
CPC .. G02B 6/3825; G02B 6/3874; G02B 6/3893; G02B 6/3897; G02B 6/3831;
(Continued)

(56) References Cited

U.S. PATENT DOCUMENTS 10,502,903 B1    12/2019   Wang et al.
2005/0036744 A1    2/2005   Caveney et al.
(Continued)

FOREIGN PATENT DOCUMENTS

CN           2929746 Y      8/2007
CN         202057832 U     11/2011
(Continued)

OTHER PUBLICATIONS

Extended Search Report issued in European Patent Application No. 20941979.5, dated Jun. 5, 2024.
(Continued)

*Primary Examiner* — Michelle R Connelly
(74) *Attorney, Agent, or Firm* — Knobbe, Martens, Olson & Bear, LLP (57) ABSTRACT

An adapter assembly, relating to field of optical communication and comprising: a housing enclosed to form a chamber; a holding sleeve integrally formed with the housing, in which a receiving chamber is provided, wherein one end of the holding sleeve is provided in the chamber and the other end protrudes from the housing, and wherein the holding sleeve is provided with an opening communicated with the receiving chamber; a clamping member provided in the opening and detachably connected with the holding sleeve; a ceramic sleeve provided within the receiving chamber; and fixing members provided at two ends of the holding sleeve and fixedly connected with the holding sleeve to limit the ceramic sleeve. The axes of holding sleeves are the axes thereof, which avoids multiple holding sleeves from deviating each other due to assembly errors, and ensures that the ceramic sleeve may float freely within the holding sleeve.

9 Claims, 8 Drawing Sheets

(58) Field of Classification Search
CPC .. G02B 6/3878; G02B 6/3807; G02B 6/3877; G02B 6/3869; G02B 6/3851; G02B 6/3873
See application file for complete search history.

(56) References Cited

U.S. PATENT DOCUMENTS

| | | | |
|---|---|---|---|
| 2006/0083467 A1* | 4/2006 | Kramer | G02B 6/3849 385/60 |
| 2007/0217747 A1 | 9/2007 | Greub et al. | |
| 2010/0220962 A1 | 9/2010 | Caveney et al. | |
| 2012/0301080 A1 | 11/2012 | Gniadek | |
| 2017/0219779 A1* | 8/2017 | Takano | G02B 6/3831 |
| 2019/0353852 A1 | 11/2019 | Lee et al. | |
| 2020/0026007 A1 | 1/2020 | Dobler | |

FOREIGN PATENT DOCUMENTS

| | | |
|---|---|---|
| CN | 103543501 A | 1/2014 |
| CN | 104880779 A | 9/2015 |
| CN | 105278052 A | 1/2016 |
| CN | 105974531 A | 9/2016 |
| CN | 105866900 B | 6/2018 |
| CN | 209992708 U | 1/2020 |
| CN | 110989096 A | 4/2020 |
| CN | 210347990 | 4/2020 |
| CN | 111708126 B | 1/2022 |
| JP | S59-66221 | 5/1984 |
| JP | S61-60213 | 4/1986 |
| JP | 2005/070790 A | 3/2005 |
| JP | 2007-052250 | 3/2007 |
| JP | 2020-131112 | 8/2020 |
| WO | WO 2017/131717 | 8/2017 |

OTHER PUBLICATIONS

Notice of Reasons for Refusal issued in Japanese Application No. 2022-574216, dated Feb. 6, 2024.
Notice of Reasons for Refusal issued in Japanese Application No. 2022-574216, dated Jul. 30, 2024.
International Search Report issued in International Application No. PCT/CN2020/138409, mailed on Mar. 23, 2021.
Search Report issued in Chinese Application No. 202010592607.9, dated Mar. 3, 2021.

* cited by examiner

ADAPTER ASSEMBLY

CROSS-REFERENCE TO RELATED APPLICATION

The present disclosure claims the priority of a Chinese patent application No. 202010592607.9 filed on Jun. 24, 2020, the disclosure of which is hereby incorporated by reference herein in its entirety.

TECHNICAL FIELD OF THE DISCLOSURE

The present disclosure relates to the technical field of optical communication devices, and in particular, to an adapter assembly.

BACKGROUND

The adapter assemblies are optical fiber movable connectors, also known as optical passive devices to realize movable connection between optical fibers, which have the function of movable connection between optical fibers and optical fibers, optical fibers and active devices, optical fibers and other passive devices, and optical fibers and instruments.

An associated adapter assembly includes a housing, sleeve retaining members and a ceramic sleeve, wherein the sleeve retaining members are provided within the housing, and the ceramic sleeve is provided within the sleeve retaining member and is provided with a through-hole for accommodating optical fibers. The optical fibers include a first optical fiber and a second optical fiber. When the first optical fiber and the second optical fiber are inserted into two ends of the ceramic sleeve for docking, the ceramic sleeve provides adjustment space through free floating thereof, so that the first optical fiber and the second optical fiber may be coaxially docked, thereby ensuring that a light beam in the first optical fiber is parallel to a light beam in the second optical fiber and the adapter assembly has good alignment performance. It should be noted that the collimation refers to keeping the light beam of the first optical fiber and the light beam of the second optical fiber parallel to each other.

The related sleeve retaining members are divided into a first sleeve retaining member and a second sleeve retaining member. One end of the ceramic sleeve is placed within a through-hole of the first sleeve retaining member, and the other end of the ceramic sleeve is placed within a through-hole of the second sleeve retaining member. The first sleeve retaining member and the second sleeve retaining member are performed coaxial alignment assembly to realize the coaxial docking of the through-holes. Due to the fact that errors exist in the assembly process, the sleeve retaining members are not completely coaxial during the actual alignment assembly, so that the ceramic sleeve is not be able to float freely within the through-hole of the sleeve retaining member, thereby affecting the collimation performance of the adapter assembly.

SUMMARY

Embodiments of the present disclosure provide an adapter assembly so as to solve the technical problem of how to improve the collimation performance of the adapter assembly.

The embodiments of the present disclosure provide an adapter assembly, comprising: a housing which is enclosed to form a chamber; a holding sleeve, which is integrally formed with the housing and in which a receiving cavity is provided, wherein one end of the holding sleeve is provide within the chamber, and the other end of the holding sleeve protrudes from the housing, and wherein the holding sleeve is provided with an opening communicated with the receiving cavity; a clamping member, which is provided in the opening and is detachably connected with the holding sleeve; a ceramic sleeve, which is provided within the receiving cavity; and fixing members, which are provided at two ends of the holding sleeve, and is fixedly connected with the holding sleeve to limit the ceramic sleeve.

Further, the opening is a plurality of openings which are provided at internals along a circumferential direction of the holding sleeve.

Further, the plurality of openings are provided at equal internals along the circumferential direction of the holding sleeve.

Further, the opening includes a first opening provided at the one end of the holding sleeve and a second opening provided at the other end of the holding sleeve opposite to the one end; and the clamping member includes a first clamping member provided in the first opening and a second clamping member provided in the second opening.

Further, the fixing member includes a body and projections, wherein the body has a through-hole communicated with the receiving cavity, and the projections are provided at intervals along a circumferential direction of the body and are fixedly connected with the body.

Further, the fixing member includes a snap ring, which includes a first snap ring and a second snap ring provided at internals along a circumference of the holding sleeve; and the projections includes a first projection and a second projection provided at intervals along a circumference of the body, wherein the first projection is connected with the first snap ring and the body, and the second projection is connected with the second snap ring and the body.

Further, the fixing member includes a body and projections, wherein the body is an arc-shaped structure, and the projections are provided at intervals along the arc and is fixedly connected with the body.

Further, an aperture of the first through-hole is less than an outer diameter of the ceramic sleeve.

Further, an outer surface of the clamping member smoothly transitions to an outer surface of the holding sleeve.

Further, the adapter assembly further comprises a cover plate adjacent to the housing, which is provided at one end of the clamping member close to the housing, and is fixedly connected with the clamping member.

The adapter assembly provided by the present disclosure comprises a housing, a ceramic sleeve, a holding sleeve, a clamping member, and fixing members. A receiving cavity is formed within the holding sleeve to receive the ceramic sleeve. The holding sleeve includes an opening, and the clamping member is provided in the opening and is detachably connected with the holding sleeve. The fixing members are provided at two ends of the holding sleeve to prevent the ceramic sleeve from sliding out. The holding sleeve of the present disclosure is integrally formed with the housing, and the end of the holding sleeve is an opening end. The holding sleeve is placed in the receiving cavity from the opening end of the holding sleeve along an axis direction of the holding sleeve. A barrel of the holding sleeve is provided with an opening, and the clamping member is stuck in the opening of the holding sleeve, then the opening is closed, and then the clamping member is detachably connected with the holding sleeve. The fixing member may resist the ceramic sleeve skidding off the end of the holding sleeve. The axis of the holding sleeve is the axis of the holding sleeve itself, which prevents the problem that multiple retaining members are not coaxial with each other due to assembly errors, and which ensures that the ceramic sleeve may float freely within the retaining member. As a result, when the optical fibers are inserted into both ends of the ceramic sleeve for docking, the coaxial docking between the optical fibers is ensured, so that the adapter assembly has good alignment performance.

BRIEF DESCRIPTION OF THE DRAWINGS

In order to more clearly explain the embodiments of the present disclosure or the technical solutions in the prior art, the drawings required in the embodiments of the present disclosure or the description of the prior art are briefly introduced in the followings.

DESCRIPTION OF THE REFERENCE SIGNS

1—sleeve retaining member
11—first through-hole of the sleeve retaining member
121—first sleeve retaining member
1211—first receiving cavity
122—second sleeve retaining member
1221—second receiving cavity
2—housing
21—chamber
3—ceramic sleeve
31—second through-hole of the ceramic sleeve
4—holding sleeve
41—receiving cavity
42—opening
421—first opening
422—second opening
5—clamping member
51—first clamping member
52—second clamping member
6—fixing member
61—body
611—first through-hole of the body
62—projection
621—first projection
622—second projection
63—snap ring
631—first snap ring
632—second snap ring
7—cover plate

DETAILED DESCRIPTION

In order to make the objectives, technical solutions and advantages of the present disclosure clearer, the following further describes the present disclosure in detail in combination with the drawings and embodiments. It should be understood that the specific embodiments described herein are merely used to explain the present disclosure, not to limit the present disclosure.

Each specific technical feature described in the specific embodiments, may be combined in any suitable way without contradiction, for example, different embodiments and technical solutions may be formed by the combination of different specific technical features. In order to prevent unnecessary repetition, the various possible combinations of each specific technical feature in the present disclosure will not be described separately.

In the following description, the terms "first\second\ . . . " merely distinguish different objects and do not indicate similarities or connections between each object. It should be understood that both the orientation descriptions "above" and "below" are the orientation in normal usage.

It should be noted that the terms "including", "comprising" or any other variation thereof are intended to cover non-exclusive inclusions, such that a process, method, article, or apparatus comprising a series of elements includes not only those elements, but also other elements that are not explicitly listed, or elements inherent to such process, method, article or apparatus. Without further limitation, an element defined by the statement "including a . . . " does not exclude the existence of another identical element in a process, method, article or apparatus that includes that element.

An adapter assembly provided in the embodiments of the present disclosure is mainly used for optical passive devices which realize movable connection between equipment, between equipment and instruments, between equipment and optical fibers (or optical cable), and between optical fibers (or optical cable) and optical fibers (or optical cable), in optical communication systems.

Figure 1:
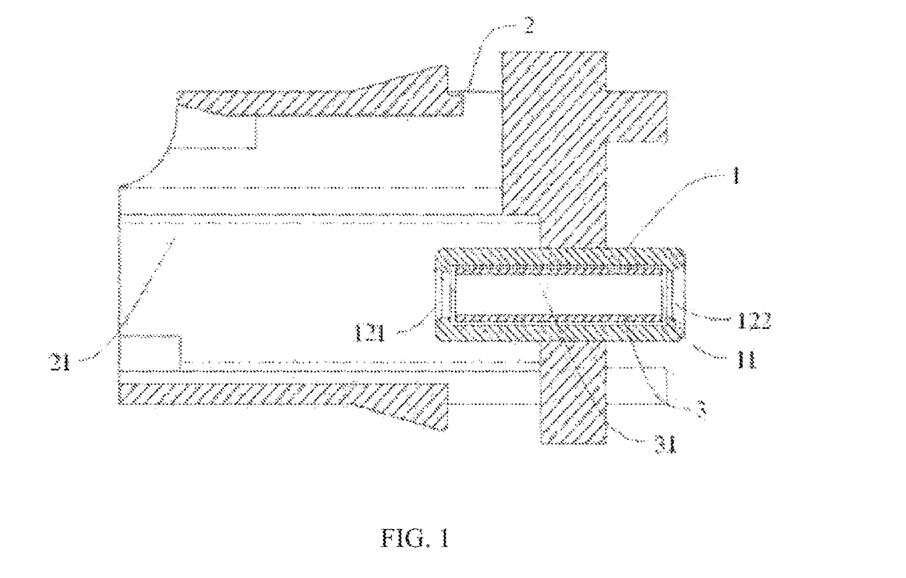
FIG. 1 is a schematic diagram of a working principle of a related adapter assembly.

An application of the adapter assembly to a connector is taken as an example, and it should be noted that the type of application scene of the present disclosure is not limited to the present disclosure. The working principle of the adapter assembly is exemplarily illustrated combined with FIG. 1. The adapter assembly may include a sleeve retaining member 1, a housing 2, and a ceramic sleeve 3. The housing 2 may be an approximate cube structure, wherein one end of the housing 2 is an opening end, and thus the housing 2 forms a chamber 21 through enclosure. Along a length-extending direction of the sleeve retaining member 1, one end of the sleeve retaining member 1 is located in the chamber 21, and the opposite end protrudes from an outer surface of the housing 2. The sleeve retaining member 1 may be an approximately cylindrical structure, and the sleeve retaining member 1 has a first through-hole 11 for placing the ceramic sleeve 3. The ceramic sleeve 3 has a second through-hole 31 for placing a ceramic pin. A standard connector is inserted into the chamber 21 from the opening end of the housing 2 and is connected with the end of the sleeve retaining member 1 close to the opening end. A ceramic pin of the standard connector is inserted into the first through-hole 11, and an optical fiber core within the ceramic pin is inserted into the ceramic ferrule. A miniature connector is accessed from the other end opposite to the opening end of the housing 2 and is connected with the opposite end of the sleeve retaining member 1. The ceramic pin of the miniature connector is inserted into the first through-hole 11, and an optical fiber core within the ceramic pin is inserted into the ceramic ferrule, and then is connected with the optical fiber core of the standard connector. The adapter is connected with the optical fiber core between the standard connector and the miniature connector through the sleeve retaining member 1, and the housing 2, the ceramic sleeve 3 and other assemblies to realize docking and transmission of the optical path.

Figure 2A:
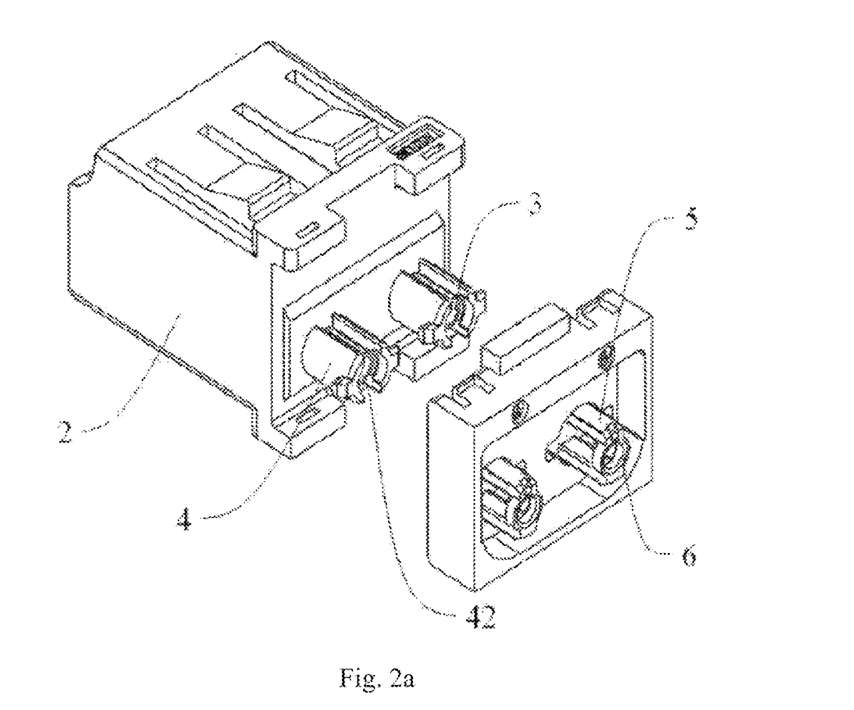
FIG. 2a is a schematic explosive view of an adapter assembly according to an embodiment of the present disclosure.
Figure 3:
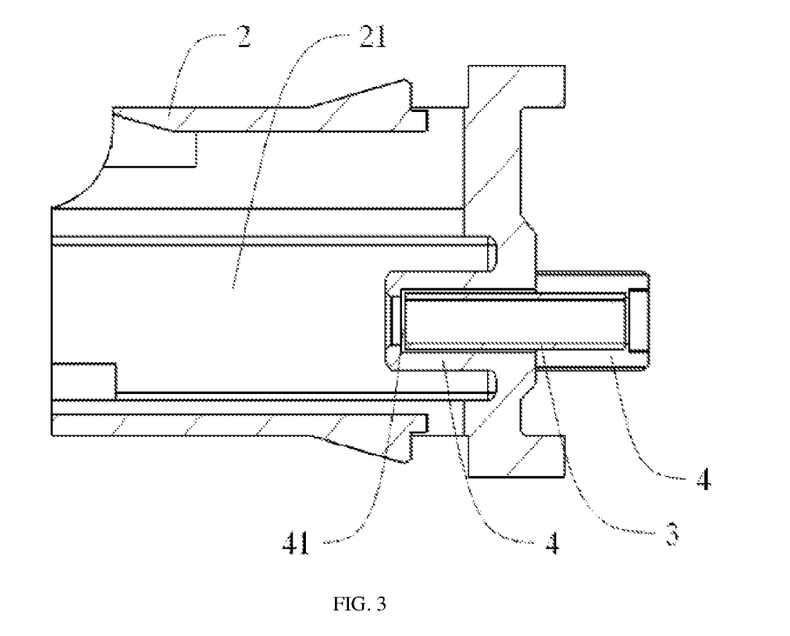
FIG. 3 is a schematic cross-sectional diagram of a housing of an adapter assembly according to an embodiment of the present disclosure.

In the embodiments of the present disclosure, as shown in FIG. 2a and FIG. 3, the adapter assembly includes a housing 2, a ceramic sleeve 3, holding sleeves 4, clamping members 5, and fixing members 6, and the housing forms a chamber 21 through enclosure. Specifically, the housing 2 may be an approximate cube thin-walled structure, as shown in FIG. 3, one end of the housing 2 is an opening end for inserting the holding sleeve 4, and the other end face opposite to the opening end and the four side faces of the housing 2 form the chamber 21 through enclosure for accommodating the interface end of the standard connector.

Figure 2B:
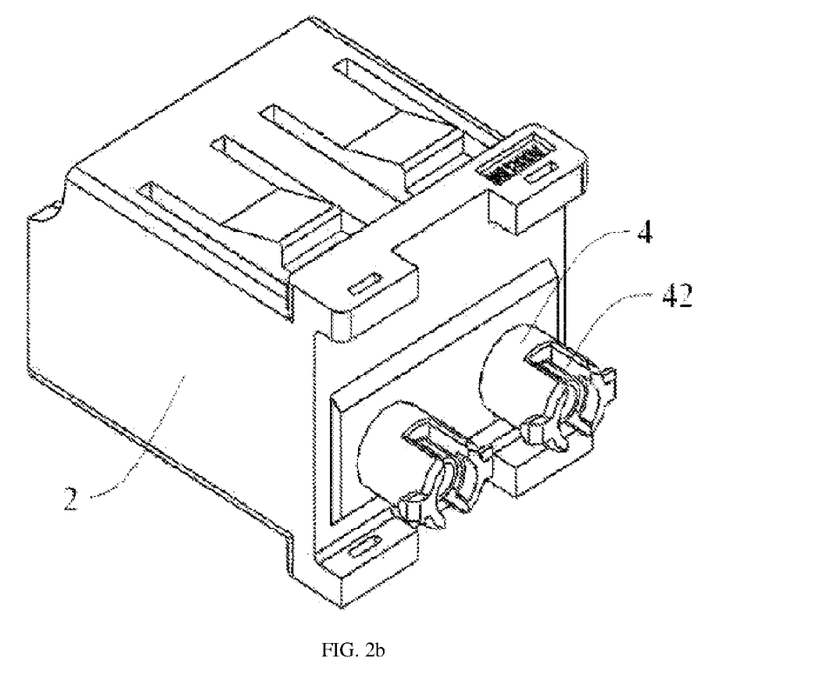
FIG. 2b is a schematic structural view of a holding sleeve of another adapter assembly.
Figure 2C:
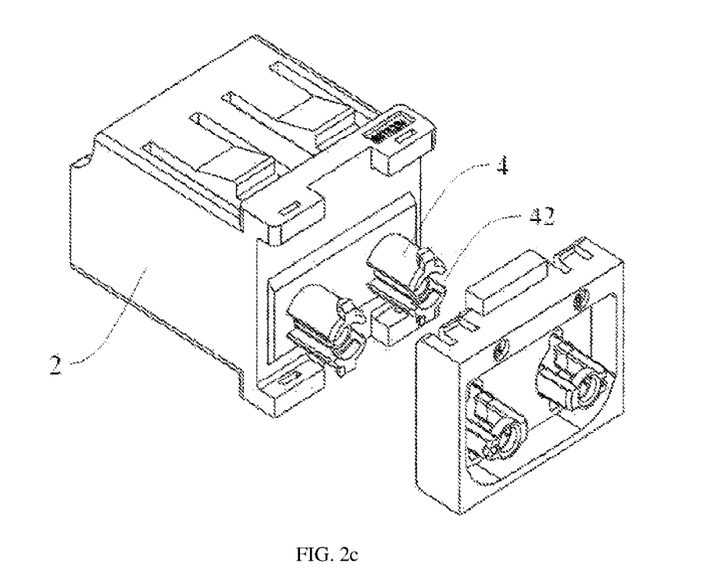
FIG. 2c is a schematic structural view of a holding sleeve of another adapter assembly.

As shown in FIGS. 2a and 3, the adapter assembly further comprises holding sleeves 4 which are integrally formed with the housing 2. A receiving cavity 41 is formed within the holding sleeve 4. One end of the holding sleeve 4 is provided in the chamber 21 and the other end protrudes from the housing 2. The holding sleeve 4 has an opening 42 which is connected with the receiving cavity 41. Specifically, as shown in FIG. 3, the holding sleeves 4 and the housing 2 are an integrally formed structure, which may prevent the problem that an assembled structure needs to be welded or bonded, and may also prevent the non-coaxial problem caused by the deflection of the holding sleeve 4 during the assembly process. One end of the holding sleeve 4 is located in the chamber 21, and may be connected with a standard connector terminal inserted into the chamber 21. The other end of the holding sleeve 4 protruding from the housing 2 may be connected with a miniature connector terminal outside the housing 2. The holding sleeve 4 may be an approximately cylindrical barrel having one side face, and a space formed through enclosure of the side face is just the receiving cavity 41. Two ends of the barrel both are opening ends, and the ceramic sleeve 3 may be placed in the receiving cavity 31 from the opening ends. As shown in FIG. 2a, along a length-extending direction of the holding sleeve 4, openings 42 are provided at one end of the holding sleeve 4, and their length are arbitrary. As shown in FIG. 2a, the lengths of the openings 42 are the same as the lengths of the portions of the holding sleeves 4 protruding from the housing 2; however, as shown in FIG. 2b, the lengths of the openings 42 are less than the lengths of the portions of the holding sleeves 4 protruding from the housing 2. The openings 42 are arbitrary provided along the circumferential direction. As shown in FIG. 2a, the directions of the openings 42 are perpendicular to the upper and lower surfaces of the housing 2. It should be noted that the up-down direction refers to an up-down direction in the working state of the adapter assembly. As shown in FIG. 2c, the directions of the openings 42 are perpendicular to the left and right surfaces of the housing 2. Preferably, in the embodiment of the present disclosure, the opening 42 shown in FIG. 2a is taken as an example for explaining the holding sleeves 4 in the following. The holding sleeve 4 is an integrally formed structure, and the ceramic sleeve 3 may be inserted from one end of the holding sleeve 4 provided with the openings 42 and placed within the receiving cavity 41 of the holding sleeve 4 in the axis direction of the holding sleeve 4. A central axis of the barrel is just an axis of the holding sleeve 4, and there is only one such axis. The ceramic sleeve 3 may be coaxial with the holding sleeve 4, and the ceramic sleeve 3 may float freely within the holding sleeve 4.

Figure 4:
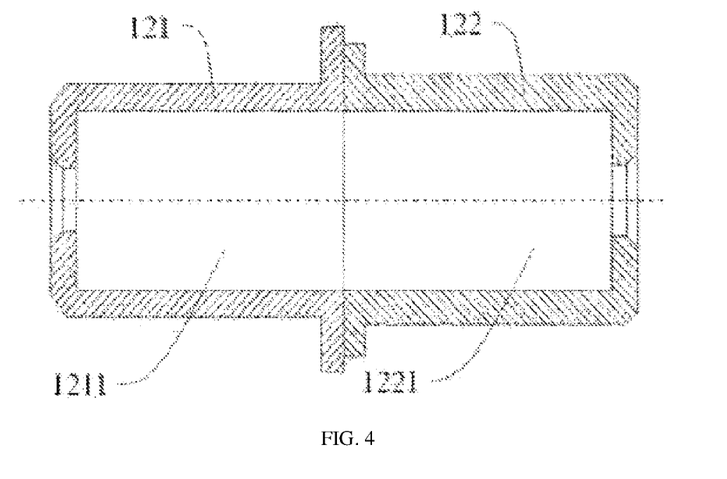
FIG. 4 is a schematic structural diagram of a sleeve retaining member of a related adapter assembly.

As shown in FIG. 4, the related sleeve retaining member includes a first sleeve retaining member 121 and a second sleeve retaining member 122. The first sleeve retaining member 121 has a first receiving cavity 1211, and the second sleeve retaining member 122 has a second receiving cavity 1221. One end of the ceramic sleeve 3 is inserted into the first receiving cavity 1211, and the opposite end of the ceramic sleeve 3 is inserted into the second receiving cavity 1221. The first receiving cavity 1211 and the second receiving cavity 1221 together form a space for placing the ceramic sleeve 3. The first sleeve retaining member 121 and the second sleeve retaining member 122 are connected by coaxial alignment assembly to form the sleeve retaining member. Since there are certain errors in the actual assembly process, an axis of the first sleeve retaining member 121 and an axis of the second sleeve retaining member 122 are not on the same straight line, and a cavity formed by the first receiving cavity 1211 and the second receiving cavity 1221 is deflected to a certain extent. As a result, the ceramic sleeve is not able to float freely within the receiving cavity, and when the first optical fiber and the second optical fiber are inserted into the corresponding through-holes at both ends of the ceramic sleeve 3 for docking, the first optical fiber and the second optical fiber cannot be coaxially docked, thereby affecting the collimation performance of the adapter assembly. On the one hand, the holding sleeve 4 of the embodiment of the present disclosure provides a space capable of placing the ceramic sleeve. On the other hand, the holding sleeve 4 is an integrated structure and is integrally formed with the housing 2, and the axis of the holding sleeve 4 is the axis of the above-mentioned integrated structure per se, which prevents the problem that multiple sleeve retaining members are not coaxial with each other due to assembly errors, thereby maintaining the floatability of the ceramic sleeve and improving the collimation performance of the adapter assembly.

Figure 5:
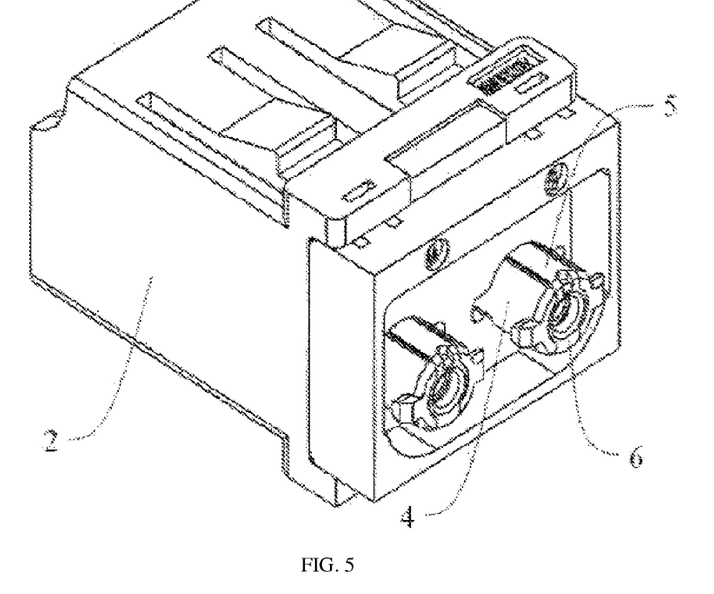
FIG. 5 is a schematic assembly diagram of an adapter assembly according to an embodiment of the present disclosure.

As shown in FIG. 5, the adapter assembly further includes clamping members 5 which are provided in the opening 42 and are detachably connected with the holding sleeves 4. Specifically, in the axis direction of the holding sleeve 4, the clamping members 5 may perform assembly connection with the holding sleeves 4 to close the opening 42, so as to shield and protect the exposed portions of the ceramic sleeves. The shape and size of the clamping member 5 match with the shape and size of the opening 42, so that good fit between the retaining cover plate 5 and the third opening 43 may be ensured.

As shown in FIGS. 2a and 3, the adapter assembly further comprises ceramic sleeves 3 which are provided within the receiving cavities 41, respectively.

As shown in FIG. 5, the adapter assembly further comprises fixing members 6 which are provided at two ends of the holding sleeve 4 and are connected with the holding sleeve 4 to limit the ceramic sleeve 3. It should be noted that the ceramic sleeve being limited in the receiving cavity 41 means that the ceramic sleeve 3 may float within the receiving cavity 41 to a certain extent, because there is a gap between the ceramic sleeve 3 and the holding sleeve 4. However, the ceramic sleeve 3 cannot move beyond the receiving cavity 41. Fixing members 6 may be provided at two ends of the holding sleeve 4 to limit the ceramic sleeve 3 to move in the axis direction of the holding sleeve 4 and prevent the ceramic sleeve 3 from sliding out of two ends of the holding sleeve 4. The fixing members 6 may be provided in a flexible manner At the end of the holding sleeve 4 without providing the opening 42, the fixing members 6 may be integrally formed with the holding sleeve 4, so as to prevent the ceramic sleeve 3 from sliding out of one end of the holding sleeve 4. As shown in FIG. 2a, at the other end of the holding sleeve 4 with the openings 42 provided, the fixing members 6 are integrally formed with the clamping member 5 to be stuck in the opening 42 of the holding sleeve 4, in order to protect the ceramic sleeve 3 from sliding out of the other end of the holding sleeve 4.

The holding sleeve 4 of the embodiment of the present disclosure is integrally formed with the housing 2, and forms a receiving cavity 41 through enclosure. The ends of the holding sleeve 4 are opening ends, and the ceramic sleeve 4 may be placed in the receiving cavity 41 along the axis direction of the holding sleeve 4. The barrel of the holding sleeve 4 is provided with openings 42, and the clamping member 5 is stuck in the openings of the holding sleeve 4, then the openings 42 are closed and the clamping member 5 is detachably connected with the holding sleeve 4. The fixing members 6 may resist the ceramic sleeve 3 sliding out of the ends of the holding sleeve 4. The holding sleeve 4 does not need coaxial alignment assembly, thus eliminating the collimation performance defects caused by multiple retaining members being non-coaxial.

Figure 6:
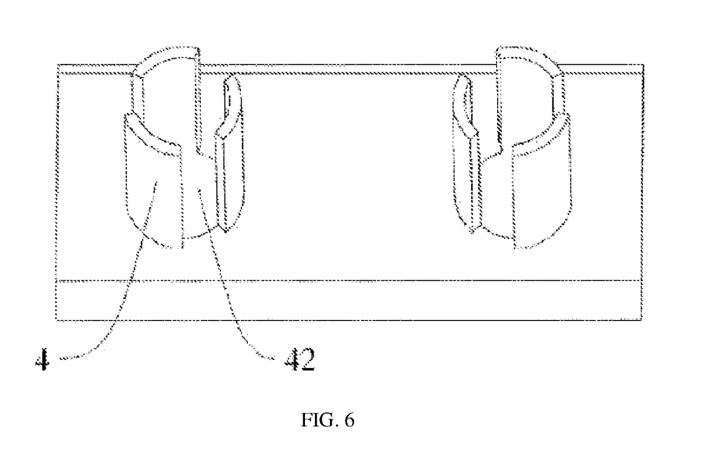
FIG. 6 is a schematic structural diagram of an opening of another adapter assembly.

In some embodiments, as shown in FIG. 2a, the openings 42 includes a plurality of openings which are arranged at internals along the circumferential direction of the holding sleeve 4. Specifically, the number of the opening is arbitrary. As shown in FIG. 2a, there are two openings 42 arranged at internals along the circumferential direction of the holding sleeve 4; as shown in FIG. 6, there are three openings 42 arranged at internals along the circumferential direction of the holding sleeve 4. Preferably, the number and structure of openings shown in FIG. 2a are taken as an example in the following. Correspondingly, the number of the clamping members 5 is the same of the number of the openings 42.

In some embodiments, as shown in FIG. 2a, the openings 42 are arranged at equal spacing along the circumferential direction of the holding sleeve 4. Specifically, in order to simply the production process, the distances between the openings 42 along the circumferential direction of the holding sleeve 4 are the same.

Figure 7A:
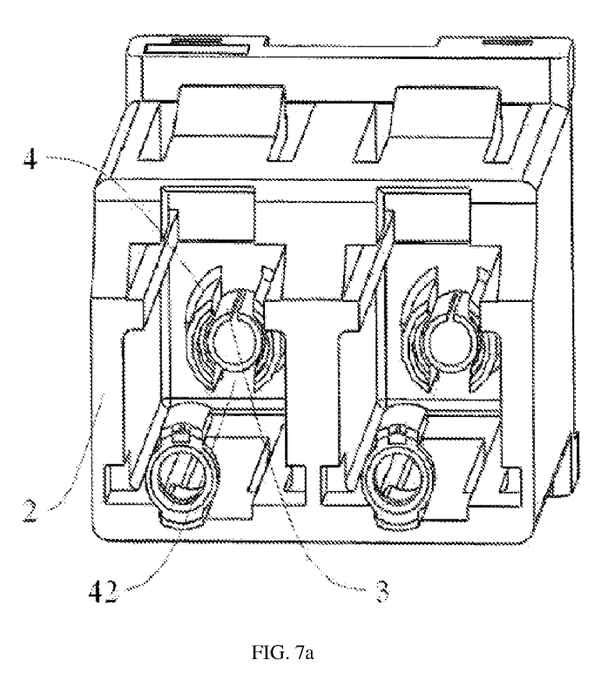
FIG. 7a is a schematic structural diagram of an opening of another adapter assembly.
Figure 7B:
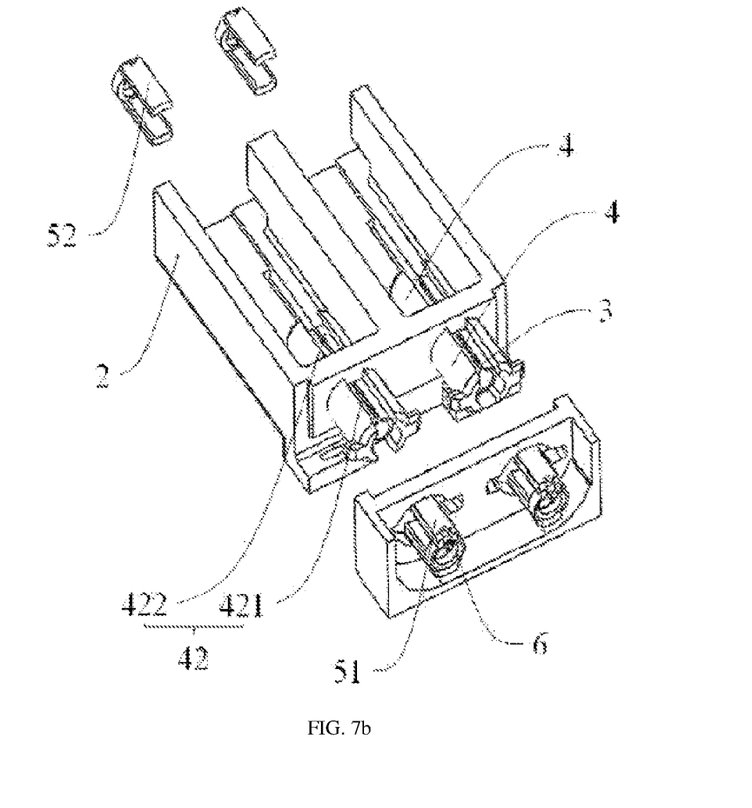
FIG. 7b is a schematic structural diagram of an opening of another adapter assembly.

In some embodiments, as shown in FIG. 7b, the openings 42 include a first opening 421 disposed at one end of the holding sleeve 4 and a second opening 422 disposed at the opposite end of the holding sleeve 4; and the clamping members 5 include a first clamping member 51 disposed in the first opening 421 and a second clamping member 52 disposed in the second opening 422. Optionally, the openings 42 may be provided at one or both ends of the holding sleeve 4. As shown in FIG. 2a, the openings 42 are provided only at one end of the holding sleeve 4 protruding from the housing 2, and the fixing member 6 disposed at the opposite end of the holding sleeve 4 without the openings 42 is integrated with the holding sleeve 4. The ceramic sleeve 3 may be inserted into the receiving cavity 41 of the holding sleeve 4 from the one end provided with the opening 42. The fixing member 6 disposed at an end of the sleeve 4 is integrated with the clamp 5, and is inserted into the opening 42 to close the opening 42. As shown in FIG. 7a, the openings 42 are provided only at one end of the holding sleeve 4 located at the chamber 21, and the ceramic sleeve 3 is inserted from one end of the holding sleeve 4 close to the chamber 21. As shown in FIG. 7b, both ends of the holding sleeve 4 are provided with openings 42 corresponding to the first opening 421 and the second opening 422, respectively. Accordingly, a first clamping member 51 and a second clamping member 52 are arranged at the corresponding ends. The fixing member 6 and the clamping member 5 are formed in one body, which may be inserted in the ceramic sleeve 3 from both ends of the holding sleeve 4, and the fixing member 6 and the clamping member 5 are detachably stuck at the holding sleeve 4. Preferably in the embodiment of the present disclosure, the structures of the opening 42 and the clamping member 5 as shown in FIG. 2a are adopted.

Figure 8A:
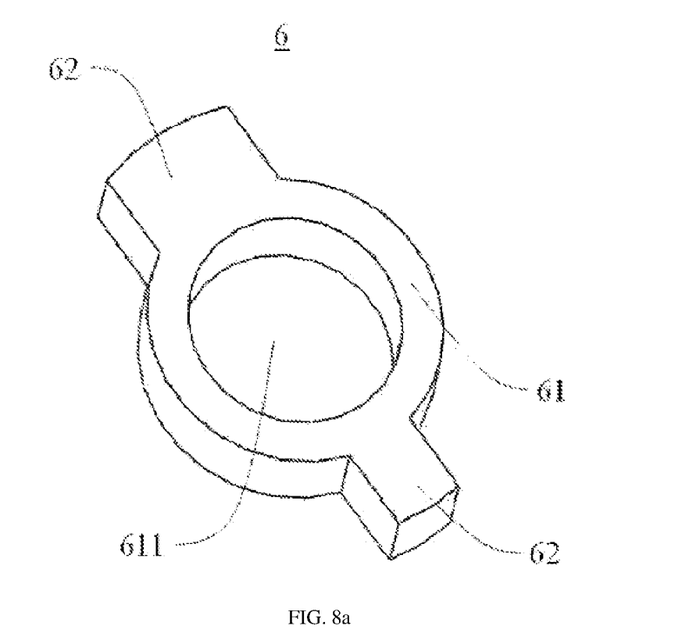
FIG. 8a is a schematic structural diagram of a fixing member of an adapter assembly according to an embodiment of the present disclosure.

In some embodiments, as shown in FIG. 8a, the fixing member 6 includes a body 61 and projections 62. The body 61 has a first through-hole 611 communicated with the receiving cavity 41, and the projections 62 are arranged at internals along the circumferential direction of the body 61 and is fixedly connected to the body 61. Specifically, the body 61 is used to prevent the ceramic sleeve 3 from sliding out of the end of the holding sleeve 4, and the body 61 may be roughly annular, with a first through-hole 611 in the middle for the insertion of ceramic pins. The projections 62 are arranged at intervals along the circumferential direction of the body 61, which may be arranged at equal intervals and integrated with the body 61. The number of projections 62 is arbitrary and may be multiple, depending on the production process and actual needs. As shown in FIG. 8a, two projections 62 are arranged at intervals along the circumferential direction of the body 61, and may form a chimeric connection with the end of the holding sleeve 4.

Figure 8B:
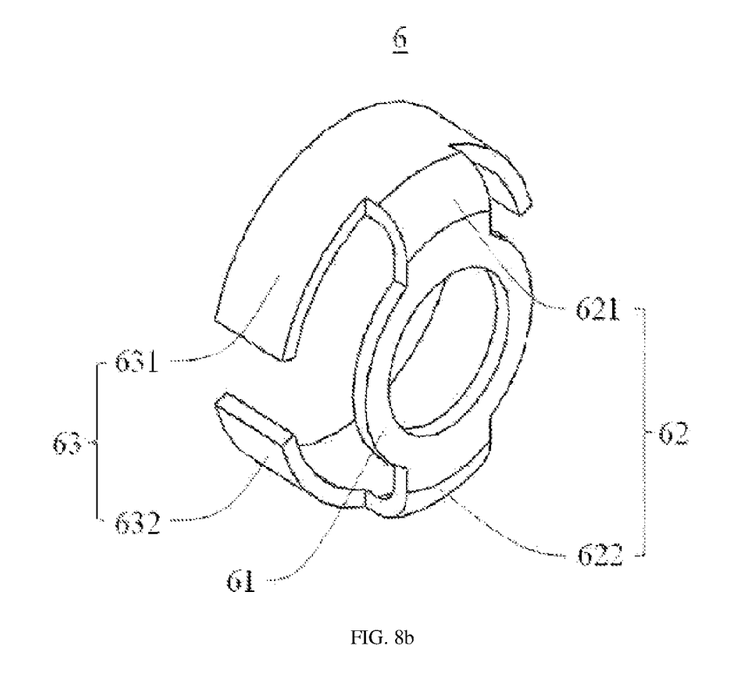
FIG. 8b is a schematic structural diagram of a fixing member of another adapter assembly.

Optionally, as shown in FIG. 8b, the fixing member 6 also includes a snap ring 63, which includes a first snap ring 631 and a second snap ring 632 arranged at intervals along the circumference of the holding sleeve 4; and the projections 62 include a first projection 621 and a second projection 622 arranged at intervals along the circumference of the body 61. The first projection 621 is connected with the first snap ring 631 and the body 61, and the second projection 622 is connected with the second snap ring 632 and the body 61. Specifically, the body 61, the projection 62 and the snap ring 63 are formed in one body, and the snap ring 63 is outsourced to the holding sleeve 4. The number of snap ring 63 is arbitrary, which may be determined according to the number of projections 62. In an exemplary embodiment, the arranging mode of two snap rings 63 and two projections 62 as shown in FIG. 8b may be selected.

Figure 8C:
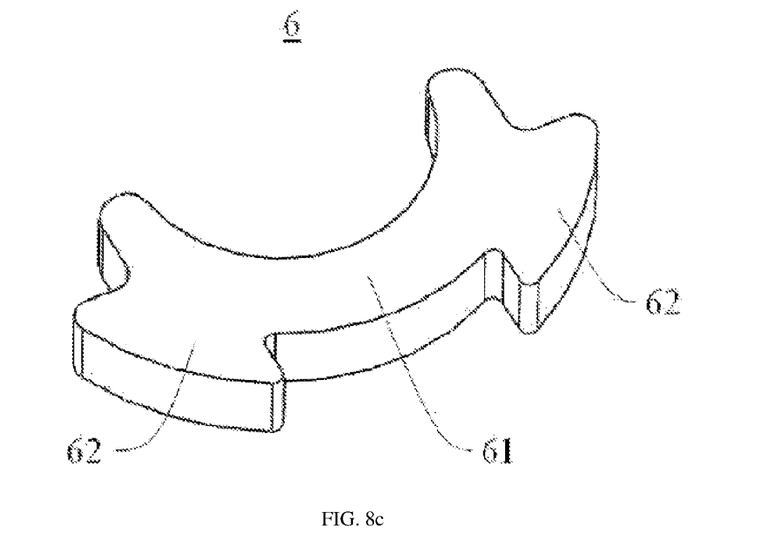
FIG. 8c is a schematic structural diagram of a fixing member of another adapter assembly.

Optionally, as shown in FIG. 8C, the fixing member 6 includes a body 61 and projections 62, wherein the body 61 is an arc-shaped structure, and the projections 62 are arranged at intervals along the arc and is fixedly connected with the body 61. Specifically, the angle of the arc is designed to prevent the ceramic sleeve 3 from sliding out of the end of the holding sleeve 4.

In some embodiments, as shown in FIG. 8a, the aperture of the first through-hole 611 is smaller than the outer diameter of the ceramic sleeve 3. Specifically, the ceramic sleeve 3 can be prevented from sliding out of the first through hole 611.

In some embodiments, as shown in FIG. 5, there is a smooth transition between the outer surface of the clamping member 5 and the outer surface of the holding sleeve 4. Specifically, taking into account the suitability and aesthetics of the process, the clamping member 5 may be an arc-shaped piece, which may be connected with the holding sleeve 4 to form a complete cylindrical structure, and a relatively smooth holding cavity 41 can also be formed inside.

Figure 9:
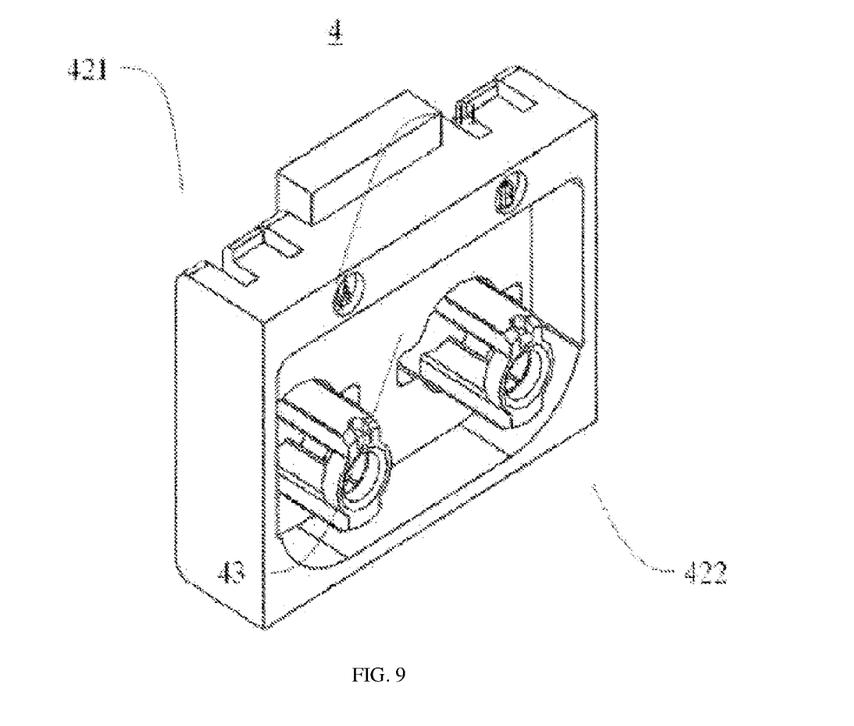
FIG. 9 is a schematic structural diagram of an end cover of an adapter assembly according to an embodiment of the present disclosure.

In some embodiments, as shown in FIG. 9, the adapter assembly also includes a cover plate 7 adjacent to the housing 2, which is arranged at one end of the clamping member 5 close to the housing 2 and is fixedly connected to the clamping member 5. Specifically, at the end of the holding sleeve 4 protruding from the housing 2, the clamping member 5 and the cover plate 7 may be arranged in one body, and the cover plate 7 forms a chimeric connection with the end face of the housing 2.

The above are merely preferred embodiments of the present disclosure and are not intended to limit the protection scope of the present disclosure.

What is claimed is:

1. An adapter assembly, comprising:
a housing which is enclosed to form a chamber;
a holding sleeve, which is integrally formed with the housing and in which a receiving cavity is provided, wherein one end of the holding sleeve is provided within the chamber and the other end of the holding sleeve protrudes from the housing, and wherein the holding sleeve is provided with an opening in communication with the receiving cavity;
a clamping member, which is provided in the opening and is detachably connected with the holding sleeve;
a ceramic sleeve, which is provided within the receiving cavity; and
fixing members, which are provided at two ends of the holding sleeve, and are fixedly connected with the holding sleeve to limit the ceramic sleeve,
wherein the opening includes a plurality of openings which are provided at intervals along a circumferential direction of the holding sleeve and which extend at least partially along a length of the holding sleeve.

2. The adapter assembly of claim 1, wherein the plurality of openings are provided at equal intervals along the circumferential direction of the holding sleeve.

3. The adapter assembly of claim 1, wherein the opening includes a first opening provided at the one end of the holding sleeve and a second opening provided at the other end of the holding sleeve opposite to the one end;
and the clamping member includes a first clamping member provided in the first opening and a second clamping member provided in the second opening.

4. The adapter assembly of claim 1, wherein a fixing member of the fixing members includes a body and projections, wherein the body has a through-hole connected with the receiving cavity, and the projections are provided at intervals along a circumferential direction of the body and are fixedly connected with the body.

5. The adapter assembly of claim 4, wherein a fixing member of the fixing members further includes a snap ring, which includes a first snap ring and a second snap ring provided at intervals along a circumference of the holding sleeve; and the projections include a first projection and a second projection provided at intervals along a circumference of the body, wherein the first projection is connected with the first snap ring and the body, and the second projection is connected with the second snap ring and the body.

6. The adapter assembly of claim 4, wherein an aperture of the through-hole is less than an outer diameter of the ceramic sleeve.

7. The adapter assembly of claim 1, wherein a fixing member of the fixing members includes a body and projections, wherein the body is an arc-shaped structure, and the projections are provided at intervals along an arc and is fixedly connected with the body.

8. The adapter assembly of claim 1, wherein an outer surface of the clamping member smoothly transitions to an outer surface of the holding sleeve.

9. The adapter assembly of claim 1, wherein the adapter assembly further comprises a cover plate adjacent to the housing, which is provided at one end of the clamping member close to the housing, and is fixedly connected with the clamping member.

* * * * *